Patented Mar. 26, 1929.

1,706,493

UNITED STATES PATENT OFFICE.

ARTHUR LÜTTRINGHAUS, OF MANNHEIM, HEINRICH NERESHEIMER, OF LUDWIG-SHAFEN-ON-THE-RHINE, AND HANS JOSEF EMMER, OF MANNHEIM, GERMANY, ASSIGNORS TO GRASSELLI DYESTUFF CORPORATION, OF NEW YORK, N. Y., A CORPORATION OF DELAWARE.

PRODUCTION OF DIPHTHALOYL ANTHRAQUINONES.

No Drawing. Application filed September 21, 1927, Serial No. 221,137, and in Germany September 29, 1926.

It is already known that isodibenzanthrones are converted into hydroxyl derivatives of the isodibenzanthrone series, which derivatives may be used as vat dyestuffs or intermediate products for other vat dyestuffs, by treatment with oxidizing agents. Manganese dioxid in concentrated sulfuric acid or nitric acid have hitherto been used as oxidizing agents for this reaction.

We have now found that entirely different new products are obtained, which are not hydroxyl derivatives of isodibenzanthrones, and which do not show the characteristic properties of vat dyestuffs, if isodibenzanthrone or its substitution products are subjected to an energetic oxidation with particularly strong oxidizing agents, such as chromic acid, or chromic acid salts in acid solution. Considering the chemical properties and the analyses of the new oxidation products, it results that they are probably diphthaloyl-anthraquinones. These products give orange-red vats with alkaline hydrosulfite solution, but have no affinity to vegetable fibres. The new compounds may be employed for the production of vat dyestuffs.

The following example will further illustrate the nature of this invention, and how the said invention may be carried out in practice, but it is understood that the invention is not limited thereto. The parts are by weight.

Example.

A solution of 10 parts of isodibenzanthrone in 200 parts of sulfuric acid of 66° Bé. strength is introduced into a solution of 100 parts of commercial potassium bichromate in 600 parts of sulfuric acid of about 50 per cent strength in the course of two hours while stirring, the temperature being maintained at 80° to 100° C., preferably at 85 to 95° C. Stirring is continued at this temperature until a test portion of the oxidation product no longer gives a blue vat with warm alkaline hydrosulfite solution, but gives a pure orange-red vat. The reaction probably proceeds according to the following equation

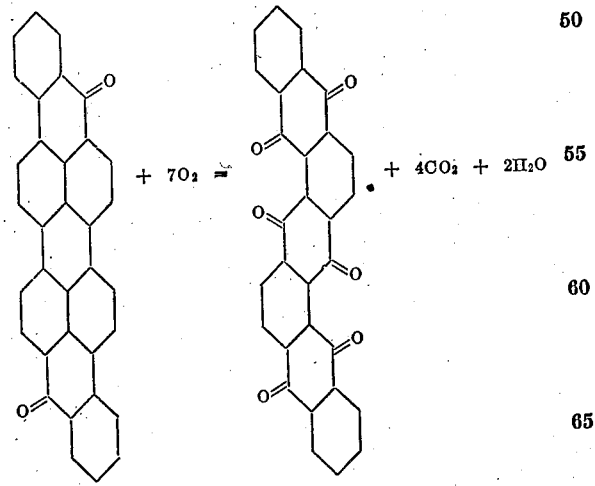

The mixture is then poured into water, and the reaction product filtered off by suction. The product is further treated with warm sodium carbonate solution, in order to extract the soluble by-products, and then worked up in the usual way.

By recrystallizing from nitrobenzene, a brownish-yellow substance is obtained from the dried crude product, which dissolves in concentrated sulfuric acid giving green colorations, and which gives an orange-red vat, which however has no affinity to vegetable fibres, with alkaline hydrosulfite solution at room temperature.

If the chlorinated isodibenzanthrone, obtainable according to Examples 1 and 2 of the U. S. Patent No. 1,003,268, be treated in the same manner, a reaction product having similar properties is obtained, which contains chlorine. In a like manner, a dichlor-diphthaloyl-anthraquinone with similar chemical properties is obtained from 6.6'-dichlor-isodibenzanthrone.

What we claim is:

1. The process of producing new anthraquinone derivatives, which consists in subjecting an isodibenzanthrone to energetic oxidation with chromic acid.

2. The process of producing a new anthraquinone derivative, which consists in adding a sulfuric acid iso-dibenzanthrone solution to a mixture of chromic acid and sulfuric acid at temperatures of from 80 to 100° C. and completing the oxidation by further heating to about said temperature.

3. As new articles of manufacture, the new anthraquinone derivatives, which are probably diphthaloyl-anthraquinones, are employable for the production of vat dyestuffs, give orange red vats with alkaline hydrosulfite solution, which have no affinity to vegetable fibres, and which are obtainable by subjecting an isodibenzanthrone to energetic oxidation with chromic acid.

4. As a new article of manufacture, a new anthraquinone derivative, which gives an orange-red vat with alkaline hydrosulfite solution but which has no affinity to the vegetable fibre, and which is obtainable by subjecting isodibenzanthrone to energetic oxidation with chromic acid and sulfuric acid, at temperatures of from 80 to 100° C.

In testimony whereof we have hereunto set our hands.

ARTHUR LÜTTRINGHAUS.
HEINRICH NERESHEIMER.
HANS JOSEF EMMER.